(12) United States Patent
Devaux et al.

(10) Patent No.: US 8,692,007 B2
(45) Date of Patent: Apr. 8, 2014

(54) METHOD FOR THE TRANSESTERIFICATION OF HYDROXYLATED OILS

(75) Inventors: Jean-Francois Devaux, Soucieu En Jarrest (FR); Georges Martino-Gauchi, Lyons (FR); Jean-Yves Balouin, Chateauneuf Sur Isere (FR); Patrice Iafrate, Roquevaire (FR); Patricia Balouin, legal representative, Chateaunneuf sur-Isere (FR); Thibault Balouin, legal representative, Pont Sainte Maxence (FR); Jeremie Balouin, legal representative, Val de Reull (FR)

(73) Assignee: Arkema France, Colombes (FR)

( * ) Notice: Subject to any disclaimer, the term of this patent is extended or adjusted under 35 U.S.C. 154(b) by 384 days.

(21) Appl. No.: 13/128,507

(22) PCT Filed: Nov. 10, 2009

(86) PCT No.: PCT/FR2009/052164
§ 371 (c)(1),
(2), (4) Date: Nov. 2, 2011

(87) PCT Pub. No.: WO2010/052443
PCT Pub. Date: May 14, 2010

(65) Prior Publication Data
US 2012/0142953 A1    Jun. 7, 2012

(30) Foreign Application Priority Data
Nov. 10, 2008 (FR) ...................................... 08 57611

(51) Int. Cl.
*C11C 3/00* (2006.01)
(52) U.S. Cl.
USPC ............................ 554/169; 554/124; 554/167
(58) Field of Classification Search
USPC ........................ 554/124, 167, 169
See application file for complete search history.

(56) References Cited

U.S. PATENT DOCUMENTS

| 5,354,878 A | 10/1994 | Connemann et al. |
| 5,399,731 A | 3/1995 | Wimmer |

FOREIGN PATENT DOCUMENTS

GB    566324    12/1994

OTHER PUBLICATIONS

Agra, I.B., et al:, "Two step ethanolysis of castor oil using sulfuric acid as catalyst to produce motor oil", Renewable Energy, Pergamon Press, Oxford, GB, vol. 9, No. 1, Sep. 12, 1996, pp. 1025-1028.
Oliveira, De D., et al,: "Optimization of Alkaline Transesterification of Soybean Oil and Castor Oil for Biodiesel Production", Applied Biochemistry and Biotechnology, Humana Press, Inc., US, vol. 121-124, Jan. 1, 2005, pp. 553-560.
Haller, A. "Alcoolyse De L'Hule De Ricin",Comptes Rendus Hebdomadaires Des Seances De L'Acedemie Dessciences, Gauthier-Villars, Paris, FR, Jan. 1, 1907, pp. 462-466.
Ma, F., et al., : "Biodiesel Production: A Review", Bioresource Technology, Elsevier BV, GB, vol. 70, No. 1, Jan. 1, 1999, pp. 1-15.

*Primary Examiner* — Yate K Cutliff
(74) *Attorney, Agent, or Firm* — Smith, Gambrell & Russell, LLP

(57) ABSTRACT

The present invention relates to a method for the transesterification of a hydroxylated oil including two consecutive transesterification steps performed in the presence of a light alcohol (methanol or ethanol) and a basic catalyst under temperature, pressure and alcohol/oil weight ratio conditions enabling the nearly total conversion of the hydroxylated oil into fatty acid esters. Characteristically, a resulting directly from the first transestrefication step in order to obtain a reaction mixture including, in particular, hydroxylated fatty acid esters and glycerol. Said reaction mixture is subjected to a separation step that makes it possible to obtain a less dense phase predominantly consisting of fatty esters and a denser phase predominantly consisting of glycerol and water and fatty acid soaps. The second transesterification step is performed on the less dense phase, with said light alcohol and said basic catalyst are added thereto.

23 Claims, No Drawings

METHOD FOR THE TRANSESTERIFICATION OF HYDROXYLATED OILS

FIELD OF THE INVENTION

The present invention relates to a process for the transesterification of a hydroxylated oil, in particular of a hydroxylated plant oil such as castor oil, said process being carried out by means of a light alcohol and in the presence of a basic catalyst, and comprising a washing step, by means of an aqueous solution, carried out on the reaction mixture resulting from the first transesterification step. This process makes it possible to obtain a fraction rich in hydroxylated fatty acid esters with a very high conversion rate.

BACKGROUND OF THE INVENTION

Castor oil is composed of triglycerides of fatty acids, of which 85% to 95% consist of ricinoleic acid. In the presence of methanol, the ester predominantly obtained by transesterification of castor oil is methyl ricinoleate (or methyl 12-hydroxy-cis-9-octadecenoate). This compound is used, inter alia, as a starting material in the production of 11-aminoundecanoic acid, a constituent monomer of Rilsan® 11, which is a polyamide with exceptional physical properties, developed by the applicant.

During the production of 11-aminoundecanoic acid, methyl ricinoleate is subjected to gas-phase thermal cracking. To this effect, it must contain a minimum amount of glycerides, i.e. of tri-, di- and monoglycerides, since these products are very difficult to vaporize, and often break down before vaporization, which results in a lowering of the selectivity of the cracking. Similarly, the methyl ricinoleate must contain a minimum amount of ricinoleic acid, which is itself also difficult to vaporize.

It is therefore desirable to have a method which makes it possible to carry out the most complete transesterification possible.

Many processes for the transesterification of plant oils are known. In order for the reaction to be considered complete, it is necessary to use excess alcohol. In order to avoid too great a consumption of alcohol, the transesterification reaction can be carried out in two steps:
  a first transesterification step is carried out in the presence of an excess of light alcohol and of an acid or basic catalyst, and then the glycerol formed is extracted from the reaction mixture in order to shift the equilibrium of the reaction toward the formation of ester of the light alcohol;
  the organic phase recovered at the end of this first step is again treated with alcohol such that a transesterification yield close to 100% is finally obtained.

Such a process is, for example, described in document U.S. Pat. No. 5,354,878, which discloses a transesterification process which admittedly makes it possible to obtain a very high conversion of plant oil to fatty acid esters, but which requires four transesterification steps with four separations of the glycerol formed. More specifically: a first transesterification step is carried out in a first reactor 14 in the form of a column, by introducing the reaction mixture containing the plant oil, methanol and NaOH into the top of the column, at a flow rate which is lower than the settling rate of the glycerol which is eliminated at the bottom of the column, and then the reaction mixture is transferred into a second reactor 20 and the transesterification is continued according to a second step without the addition of reactants; washing with water is then carried out, followed by a third trans-esterification step carried out in a third reactor 36 (with the addition of alcohol and of catalyst), and then the glycerol is separated in the same way as during the first transesterification reaction, and the reaction mixture is transferred into a fourth reactor 40 where a fourth transesterification step is carried out without the addition of reactants; the latter reaction mixture containing the transesterification product is subjected to washing with water and then to drying. The equipment required for implementing this laborious process is complex, producing increased production costs.

Moreover, although the transesterification process described in that document functions well with rapeseed oil or another oil, for example with a sunflower oil, it has been found that it is very disadvantageous to implement it with a hydroxylated plant oil such as castor oil. This is because, on a castor oil/methanol/basic catalyst reaction mixture, the rate of settling out of glycerol is 5 to 20 times slower than on the corresponding mixture with a rapeseed or sunflower oil. In order to implement the process described above with a column reactor such that the flow is sufficiently slow for the glycerol to separate from the reaction mixture during the first transesterification step, it would be necessary to have a column with a gigantic diameter.

Document U.S. Pat. No. 5,399,731 describes another process for the transesterification of fatty acid triglycerides with a light alcohol and in the presence of a basic catalyst, said process comprising one or more transesterification steps and also a step of adding water or a dilute organic or inorganic acid to the ester phase obtained after the separation of the glycerol phase. As indicated in column 4, lines 11 to 16, the addition of water (carried out after the second or the final transesterification) makes it possible to eliminate, from the ester phase, catalyst residues and other impurities. This process is considerably simpler than the previous one, which makes it possible to drastically reduce production costs. However, when an attempt is made to implement this transesterification process with castor oil, regardless of whether it is with a single or several successive transesterification steps, an ester fraction which contains too many residual glycerides to be suitable for use as a biofuel or as a starting material in the production of Rilsan® 11 is obtained.

Other documents describe transesterification processes applied to castor oil. The conversion of the oil to esters, obtained by means of these processes, does not however exceed 94%.

Document GB 566 324 describes a process for the transesterification of castor oil in the presence of methanol and a basic catalyst. According to example 2, this process comprises a first transesterification step, followed by a step of separating the lower phase, rich in glycerin, by settling out. Several variants are subsequently described for processing the fatty ester-rich upper phase. According to a first variant (example 2.a), the upper phase is washed three times in water, resulting in a glycerin recovery rate of 78%. According to a second variant (example 2.b), said upper phase is subjected to a second transesterification step in the presence of methanol and a basic catalyst, and then to an acidification step. After elimination of the excess methanol, the glycerin-rich phase is separated by settling out, resulting in a glycerin recovery rate of 86%. According to a third variant (example 2.c), said upper phase is subjected to a second and then to a third transesterification step in the presence of water, with subsequent separation of the glycerin by settling out. The conversion obtained, measured by the glycerin yield, is 94%.

The publication by Agra I. B. et al. (*Renewable Energy*, Pergamon Press, Oxford, GB, vol. 9, no. 1, Sep. 12, 1996, pages 1025-1028) describes a process for the transesterification of castor oil which is performed in two steps in the presence of methanol and sulfuric acid. After a first transesterification step, the reaction medium is neutralized by means of a sodium hydroxide solution, and sodium chloride is added in order to assist with the separation of the glycerin. The upper phase which results therefrom is subjected to a second transesterification step, resulting in a glycerin recovery rate of only 82%.

The present invention intends to remedy the drawbacks exhibited by the abovementioned transesterification processes. It aims to propose a process which is particularly suitable for the transesterification of hydroxylated oils, in particular castor oil. The objective of the present invention is therefore to provide a process for producing methyl or ethyl esters of castor oil which makes it possible to achieve a very high conversion to esters, while at the same time being carried out at moderate temperatures and pressures, and requiring only a moderate number of steps.

SUMMARY OF THE INVENTION

To this effect, a subject of the invention is a process for the transesterification of a hydroxylated oil comprising two successive transesterification steps carried out in the presence of a light alcohol (methanol or ethanol) and a basic catalyst under temperature, pressure and alcohol/oil weight ratio conditions allowing a virtually total conversion of the hydroxylated oil to fatty acid esters.

Characteristically, an aqueous solution is added to the reaction mixture resulting directly from the first transesterification step in order to obtain a reaction mixture comprising, in particular, hydroxylated fatty acid esters and glycerol. This reaction mixture is subjected to a separation step that makes it possible to obtain a less dense phase predominantly consisting of fatty esters and a denser phase predominantly consisting of glycerol, and water and fatty acid soaps. The second transesterification step is carried out on the less dense phase, with said light alcohol and said basic catalyst added thereto.

For the purpose of the invention, the term "hydroxylated oil" is intended to mean any oil, pure or as a mixture, in particular of plant origin, containing predominantly fatty acid triglycerides, the total hydroxylated fatty acid content of which is greater than 50% by weight. As examples of hydroxylated fatty acids, mention may be made of ricinoleic acid or lesquerolic acid.

In the context of the invention, use may in particular be made of: castor oil; oil extracted from Lesquerella; mixtures of castor or lesquerella oils with other plant oils; hydroxylated plant oils, pure or as a mixture, originating from genetically modified plants.

The ricinoleic esters obtained by carrying out the process according to the invention can be directly used as starting material in the production of 11-amino-undecanoic acid, a constituent monomer of Rilsan® 11. The conversion rate of the hydroxylated oil subjected to transesterification according to the process of the invention is very high, possibly reaching 99.5%.

Other features and advantages will emerge from the detailed description of the transesterification process according to the invention which follows and the non-limiting exemplary embodiments of the invention.

DETAILED DESCRIPTION

The invention is directed toward a process for the transesterification of a hydroxylated oil in which the transesterification is carried out in the presence of a light alcohol (methanol or ethanol) and a basic catalyst under temperature, pressure and alcohol/oil weight ratio conditions allowing virtual total conversion of the hydroxylated oil to fatty acid esters in only two transesterification steps, said process comprising:

a) a first step T1 of transesterification of the hydroxylated oil, resulting in the obtaining of a reaction mixture M1;
b) a step of addition of an aqueous solution S1 so as to obtain a reaction mixture A comprising in particular hydroxylated fatty acid esters and glycerol;
c) a step of separation of the reaction mixture A by static settling and/or by centrifugal settling, making it possible to obtain a less dense phase A1 pre-dominantly consisting of fatty esters and a denser phase A2 predominantly consisting of glycerol, water and fatty acid soaps;
d) a second transesterification step T2 in which said light alcohol and said basic catalyst are added to the phase A1 so as to produce a reaction mixture M2.

According to a preferred embodiment variant, the hydroxylated oil used in the context of the invention is castor oil, consisting of fatty acid triglycerides, in which the main fatty acid is ricinoleic acid. No other known natural oil contains such a high proportion of hydroxylated fatty acids. It is this characteristic glyceride composition which distinguishes castor oil from any other plant fats and oils, and it is this which gives it its noteworthy physical and chemical properties. Castor oil thus has the highest viscosity number and the highest density of all the natural oils. These properties are due in particular to the hydrogen bonds formed between the hydroxyl groups. It is these properties which give castor oil a very particular behavior during chemical reactions and which mean that the known processes for the transesterification of "ordinary" plant oils cannot quite simply be transposed to castor oil (N.B., the term "ordinary oil" is intended to mean nonhydroxylated oils extracted from oleaginous plants such as sunflower, rape or soya).

The invention is preferably applied to "$1^{st}$ grade" castor oil, which is a castor oil free of phospholipids and containing a low acidity, less than 2 mg KOH/g.

The preferred light alcohol is methanol. The basic catalyst used in the process is chosen from the group: aqueous sodium hydroxide, alcoholic sodium hydroxide, solid sodium hydroxide, aqueous potassium hydroxide, alcoholic potassium hydroxide, solid potassium hydroxide, sodium methoxide, potassium methoxide, sodium ethoxide, potassium ethoxide, sodium carbonate or potassium carbonate.

Without wishing to be bound by the theory, the transesterification of castor oil with a light alcohol takes place according to the following series of equilibria:

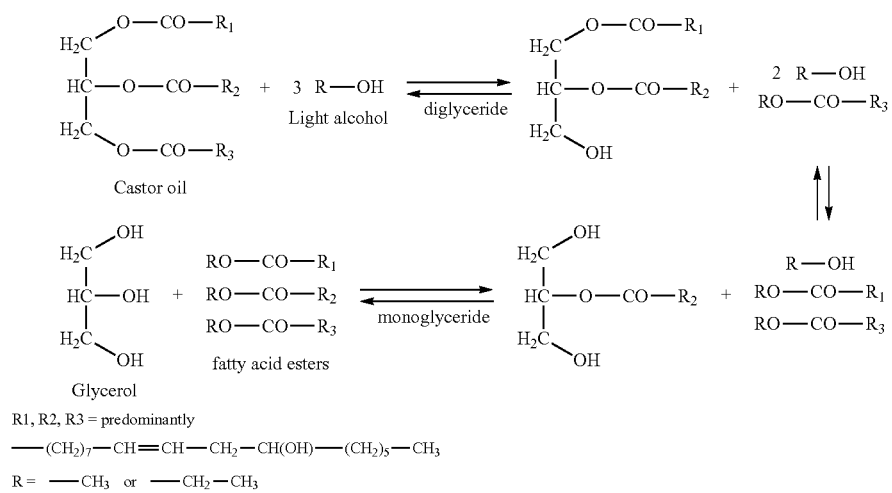

R1, R2, R3 = predominantly
—(CH$_2$)$_7$—CH=CH—CH$_2$—CH(OH)—(CH$_2$)$_5$—CH$_3$
R = —CH$_3$ or —CH$_2$—CH$_3$ It is known that the transesterification reaction medium generally consists of two phases: a (m)ethyl ester-rich phase and a glycerol-rich phase. It has now been found that, unlike with most (m)ethyl esters of fatty acids, glycerol is very soluble in the (m)ethyl ester of castor oil in the absence of water. The glycerol present in the (m)ethyl ester prevents having a very high conversion to (m)ethyl ester (it shifts the final equilibrium a little to the right). Washing with an aqueous solution after the first transesterification step reduces the glycerol content in the (m)ethyl ester-rich phase, which makes it possible to proceed to very high conversion after a second transesterification step. This result is unexpected since it might have been feared that the first washing with water would promote the formation of soaps that hinder settling.

The weight of alcohol used in step T1 is from 0.1 to 0.4, and preferably from 0.13 to 0.3, per unit weight of hydroxylated oil.

The weight of catalyst used in step T1 is from 0.001 to 0.04, and preferably from 0.0015 to 0.01, per unit weight of hydroxylated oil.

The weight of aqueous solution S1 used to obtain the reaction mixture A is from 0.01 to 0.4, and preferably from 0.05 to 0.2, per unit weight of hydroxylated oil.

The static settling of step c) can be carried out in one or more settling devices mounted in parallel or in series.

The phase A1, with alcohol and basic catalyst added thereto, undergoes a second transesterification step T2.

The weight of alcohol used in step T2 is from 0.05 to 0.3, and preferably from 0.08 to 0.2, per unit weight of hydroxylated oil.

The weight of catalyst used in step T2 is from 0.0005 to 0.03, and preferably from 0.001 to 0.08, per unit weight of hydroxylated oil.

An aqueous solution S2 is added to the reaction mixture M2 (mixture resulting from the second transesterification step T2) so as to obtain a reaction mixture B. Said reaction mixture is then subjected to a step of separation by static settling and/or by centrifugal settling, resulting in the obtaining of a less dense phase B1 predominantly consisting of fatty esters and a denser phase B2 predominantly consisting of glycerol and water, and, where appropriate, fatty acid soaps.

According to one embodiment, the process according to the invention also comprises a step R of recycling a mixture comprising fatty acid esters and/or free fatty acids and/or fatty acid salts, with basic catalyst added thereto, to the reaction mixture resulting from the second transesterification step T2, carried out before the addition of the aqueous solution S2. Generally, the amount of basic catalyst added should be sufficient to neutralize the whole of the acidity present in the medium.

The steps T1, T2, R, of separation and of addition of the aqueous solutions S1 and S2 are carried out at a pressure of less than 5 bar absolute, and preferably at a pressure of less than 2 bar absolute, and at a temperature ranging from 10 to 100° C., preferably from 15 to 60° C. and more preferentially from 20 to 50° C.

The transesterification process may also comprise a step in which the phase B1 undergoes a partial or total evaporation of the alcohol, and then a further addition of an aqueous solution S3 and a phase separation, so as to obtain a less dense phase C1 consisting of fatty esters and a denser aqueous phase C2 comprising alcohol, glycerol and soaps. The alcohol evaporation step is carried out at a temperature of between 60 and 200° C. and preferably between 100 and 180° C., and at a pressure of between 0.1 and 1.5 bar absolute. According to one embodiment, the denser aqueous phase C2 recovered is used as aqueous solution S1 and/or S2 so as to obtain the reaction mixture A and/or the reaction mixture B.

The aqueous solutions S1, S2 and S3 preferably consist of water, but may also be chosen from the group: dilute aqueous solution of sodium hydroxide, potassium hydroxide, sodium carbonate or potassium carbonate, aqueous solution of dilute acid (hydrochloric acid, sulfuric acid or other acid), or else recycled aqueous streams which contain small amounts of organic materials and/or of salts.

The denser phases A2, B2 and, optionally, C2 described above are mixed and the mixture undergoes a treatment comprising evaporation, acidification and settling steps resulting in the obtaining of a less dense oily phase D1 and a denser phase D2 predominantly consisting of glycerol and water. The objective of the evaporation step is to eliminate from the mixture a part or all of the methanol and, optionally, a part of the water present. The acidification can be carried out, for example, with sulfuric acid or hydrochloric acid. The less dense oily phase D1 predominantly consists of fatty esters and fatty acid.

The process according to the invention may also comprise an esterification step in which the oily phase D1 is reacted with the alcohol and an acid catalyst chosen from the group:

hydrochloric acid, sulfuric acid, methanesulfonic acid and para-toluenesulfonic acid, at a temperature ranging from 40 to 120° C. and a pressure of less than 10 bar, so as to obtain a mixture M3 comprising fatty acid esters and free fatty acids. The weight of alcohol used in the esterification step is from 0.1 to 1.5, and preferably from 0.2 to 0.8, per unit weight of oily phase D1. The weight of acid catalyst used in the esterification step is from 0.001 to 0.05, and preferably from 0.01 to 0.03, per unit weight of hydroxylated oil.

These last two steps generally make it possible to recover a few percentages of yield of esters which would otherwise be eliminated with the glycerol in the form of esters or soaps or fatty acids.

According to a first variant, the mixture M3 is used in the recycling step R. According to another embodiment variant, an acidic, basic or neutral aqueous solution, and preferably water, is added to the mixture M3, and said mixture is then subjected to a separation making it possible to obtain a denser aqueous phase E2 and a less dense phase E1 containing esters. In this case, it is the phase E1 which is used in the recycling step R. The phase E2 can be recycled with the mixture of the phases A1 and A2.

The process according to the invention makes it possible to obtain a virtually total conversion of the oil at the end of step T2. The term "virtually total conversion" is intended to mean the fact that the mixture obtained contains less than 5%, and preferably less than 2%, of triglycerides, diglycerides and monoglycerides relative to the fatty acid esters, i.e. a conversion of greater than 95% and preferably greater than 98%.

The steps of the invention can be carried out batchwise or continuously, in any types of reactors known to those skilled in the art and abundantly described in the publications and patents relating to the transesterification of oils. In batchwise mode, use may be made, for example, of one or more stirred reactors. In continuous mode, use may be made, without the list being limiting, of continuous stirred reactors, static mixers, column reactors and plug flow reactors.

The fatty ester mixture formed by means of the present invention and constituting the phase B1 or the phase C1 can be used, optionally after a subsequent purification, as a biofuel or additive in diesel fuels, or (when the hydroxylated oil is castor oil), as a starting material for the production, by pyrolysis or cracking, of heptanal, which is a precursor of heptanoic acid, and of methyl undecylenate which can be converted to undecylenic acid. Undecylenic acid is a starting material used for the production of 11-aminoundecanoic acid and of Rilsan® 11.

The present invention will be understood more clearly on reading the following exemplary embodiments.

Method of Analysis 50 mg of mixture of methyl fatty esters to be quantitatively determined, 1 ml of anhydrous dimethylformamide and 1 ml of a 99/1 mixture of bistrimethylsilyl-trifluoroacetamide and chlorotrimethylsilane are introduced into a 3 ml flask. After having hermetically sealed the flask, the mixture is vigorously stirred and heated at 70° C. for 20 minutes. 1 µl of the mixture is injected onto a gas chromatograph equipped with a CPSIL 5CB column (length 15 m, diameter 0.32 mm, film of thickness 0.25 µm) and a flame ionization detector. P1, the area of the methyl ester peaks, P2, the area of the monoglycerides, P3, that of the diglycerides and P4, that of the triglycerides, are noted.

The conversion to methyl esters is estimated by the following calculation: conversion=P1/(P1+P2+P3+P4).

EXAMPLE 1 ACCORDING TO THE INVENTION

Batchwise Transesterification of Castor Oil Catalyzed with Sodium Hydroxide

A mixture of 402 grams of castor oil and 132 grams of methanol is prepared at 30° C. at atmospheric pressure in a one-liter batch reactor fitted with a stirring device. 3.5 grams of 30% aqueous sodium hydroxide solution are added with vigorous stirring, the mixture is left to stir for 30 minutes at this temperature, and then 44 grams of water are added. After stirring for 5 minutes, the resulting mixture is left to settle for 2 hours. 106 grams of a lower phase A2 containing 28% of glycerol are separated. A further 47 grams of methanol and 2.8 grams of 30% aqueous sodium hydroxide solution are added to the upper phase A1. The mixture is stirred vigorously for 30 minutes at 30° C. and then a further 92 grams of water are added. After stirring for 5 minutes, the resulting mixture is left to settle. 162 grams of a lower phase B2 containing 6.4% of glycerol and 432 grams of an upper phase B1 containing 77% of methyl ricinoleate, 5% of methanol and 0.29% of glycerol are recovered. The analysis by gas chromatography after silylation shows that the conversion is 98.8%.

EXAMPLE 2 ACCORDING TO THE INVENTION

Batchwise Transesterification of Castor Oil Catalyzed with Sodium Methoxide

A mixture of 407 grams of castor oil and 126 grams of methanol is prepared at 40° C. at atmospheric pressure in a one-liter batch reactor fitted with a stirring device. 5.4 grams of methanolic solution of sodium methoxide at 25% are added with vigorous stirring, the reaction mixture is left to stir for 1 hour at this temperature, and then 41 grams of water are added. After stirring for 5 minutes the resulting mixture is left to settle for 1 hour. 98 grams of a lower phase A2 containing glycerol and water are separated. A further 28 grams of methanol and 4 grams of methanolic solution of sodium methoxide at 25% are added to the upper phase A1. The mixture is stirred vigorously for 30 minutes at 30° C., and then a further 105 grams of water are added. After stirring for 5 minutes, the resulting mixture is left to settle. 175 grams of a denser phase B2 containing glycerol and water and 438 grams of an upper phase B1 containing 77% of methyl ricinoleate, 7% of methanol and 0.1% of glycerol are recovered. The analysis by gas chromatography after silylation shows that the conversion is 99.5%.

The mixture is then heated to 140° C. in a rotary evaporator, in order to evaporate off the methanol. Washing with 100 g of water followed by settling in order to eliminate the aqueous phase C2 makes it possible to recover 399 g of a methyl ester mixture C1 containing 85% of methyl ricinoleate, 4% of methyl linoleate, 3% of methyl oleate, 1% of methyl stearate and 1% of methyl palmitate.

EXAMPLE 3 ACCORDING TO THE INVENTION

Batchwise Transesterification of Castor Oil Catalyzed with Sodium Hydroxide and Sodium Methoxide Example 2 is reproduced, with 3.1 g of 30% aqueous sodium hydroxide solution being added to the phase A1 in place of the methanolic solution of sodium methoxide. A conversion of 99.5% is obtained.

EXAMPLE 4 ACCORDING TO THE INVENTION

Continuous Transesterification of Castor Oil Catalyzed with Sodium Hydroxide

In a continuously operating apparatus, 650 g/h of castor oil, 210 g/h of methanol and 5.5 g/h of 30% aqueous sodium hydroxide solution are injected onto a static mixer connected to the bottom of a column packed with Raschig rings having an internal diameter of 2 cm and a height of 1.5 m, maintained at 30° C. by means of a jacket. The stream leaving the top of the column is mixed online, by means of a static mixer, with a stream of water of 70 g/h and then sent to a continuously operating centrifugal decanter which makes it possible to obtain a denser aqueous and glycerinous phase A2 (190 g/h) and a less dense phase A1. The continuous stream of the less dense phase A1 is mixed online, via a static mixer, with a flow rate of 75 g/h of methanol and 4.5 g/h of a 30% aqueous sodium hydroxide solution, and then injected at the bottom of a column packed with Rashig rings having an internal diameter of 2 cm and a height of 1.5 in, maintained at 30° C. by means of a jacket. 40 g/h of a recycled stream E1 (the preparation of which is described below), and also 1.5 g/h of a 30% aqueous sodium hydroxide solution are mixed online with the stream leaving the column via the top. This stream is then sent to a static mixer, where 160 g/h of aqueous phase are injected (water is used in a first experiment, and then the aqueous phase C2 described below is used in subsequent experiments). The mixture is then sent continuously to a static decanter, which makes it possible to withdraw a denser phase B2 predominantly consisting of water, glycerol and methanol (300 g/h) and a less dense phase B1 which contains the mixture of methyl esters (720 g/h). This less dense phase B1 is collected over a period of 2 hours (1440 g), and then passed to the rotary evaporator at 130° C. in order to evaporate off the methanol, then cooled to 60° C. and mixed with 400 g of water. The resulting mixture is then left to settle so as to form an aqueous phase (C2) and a methyl ester phase C1 (1320 g), containing 86% of methyl ricinoleate and 8% of C18 methyl fatty ester (stearate, oleate and linoleate).

The aqueous phases A2 and B2 are collected over a period of 2 hours (980 g). The methanol and a part of the water are then evaporated off in a rotary evaporator, to obtain 570 g of a 24% aqueous solution of glycerol. This is acidified with 14 g of 33% hydrochloric acid and then allowed to settle. The least dense phase D1 (75 g), consisting of approximately 60% of methyl fatty esters and 31% of fatty acids, is separated, mixed with 50 g of methanol and 2.5 g of 33% HCl, so as to form the mixture M3, and then heated at 90° C. for 2 hours. The conversion of the fatty acids to methyl fatty esters is greater than 80%. The mixture M3 is then washed with 75 g of water. A denser aqueous phase E2 and a less dense organic phase E1 (80 g) containing the methyl fatty esters are obtained, said phase E1 being recycled after the second transesterification step. This treatment of the aqueous phases makes it possible to increase by close to 3% the overall yield of the process for converting castor oil to a mixture of methyl fatty esters.

COMPARATIVE EXAMPLE 5

Transesterification of Castor Oil Catalyzed with Sodium Hydroxide without Intermediate Washing A mixture of 402 grams of castor oil and 132 grams of methanol is prepared at 30° C. at atmospheric pressure in a one-liter batch reactor fitted with a stirring device. 3.5 grams of 30% aqueous sodium hydroxide solution are added with vigorous stirring, the mixture is left to stir for 30 minutes at this temperature, and the resulting product is left to settle overnight. The settling is very slow. 18 grams of a lower phase containing 70% of glycerin are separated. A further 47 grams of methanol and 2.8 grams of 30% aqueous sodium hydroxide solution are added to the upper phase. Stirring is carried out vigorously for 30 minutes at 30° C. and then 92 grams of water are added. After stirring for 5 minutes, the mixture is left to settle. 172 grams of a lower phase containing 7% of glycerin and 436 grams of an upper phase containing 74% of methyl ricinoleate, 7% of methanol and 2% of glycerin are recovered. The analysis by gas chromatography after silylation shows that the conversion is only 94.8%.

The invention claimed is:

1. A process for the transesterification of a hydroxylated oil in which the transesterification is carried out in the presence of methanol or ethanol and a basic catalyst under temperature, pressure and alcohol/oil weight ratio conditions allowing a greater than 95% conversion of the hydroxylated oil to fatty acid esters in only two transesterification steps, said process comprising the steps of:
   a) transesterifying in a first transesterification (T1) said hydroxylated oil, resulting in the obtaining of a reaction mixture M1;
   b) adding an aqueous solution S1 so as to obtain a reaction mixture A comprising hydroxylated fatty acid esters and glycerol;
   c) separating said reaction mixture A by static settling and/or by centrifugal settling, to obtain a less dense phase A1 predominantly consisting of fatty esters and a denser phase A2 predominantly consisting of glycerol, water and fatty acid soaps;
   d) performing a second transesterification step T2 in which methanol or ethanol and said basic catalyst are added to the phase A1 so as to produce a reaction mixture M2.

2. The process as claimed in claim 1, further comprising a step R of recycling a mixture comprising fatty acid esters, free fatty acids and basic catalyst to the reaction mixture M2 resulting from the second transesterification step T2.

3. The process as claimed in claim 1, in which an aqueous solution S2 is added to the reaction mixture M2 or to the reaction mixture resulting from the recycling step R so as to obtain a reaction mixture B.

4. The process as claimed in claim 1, further comprising a step of separating the reaction mixture B by static settling and/or by centrifugal settling, to obtain a less dense phase B1 predominantly consisting of fatty esters and a denser phase B2 predominantly consisting of glycerol, water, and, where appropriate, fatty acid soaps.

5. The process as claimed in claim 1, in which the steps T1, T2, R, of separation and of addition of the aqueous solutions S1 and S2 are carried out at a pressure of less than 5 bar and at a temperature ranging from 10 to 100° C.

6. The process as claimed in claim 4, in which the phase B1 undergoes a partial or total evaporation of the alcohol, and then addition of an aqueous solution and a phase separation, to obtain a less dense phase C1 consisting of fatty esters and a denser aqueous phase C2 comprising alcohol, glycerol and soaps.

7. The process as claimed in claim 6, in which the denser aqueous phase C2 recovered is used as aqueous solution S1 or S2 to obtain the reaction mixture A or the reaction mixture B.

8. The process as claimed in claim 6, in which the denser phases A2, B2 and, optionally, C2 are mixed and the mixture undergoes a treatment comprising evaporation, acidification and settling steps resulting in the obtaining of a less dense oily phase D1 and a denser phase D2 predominantly consisting of glycerol and water.

9. The process as claimed in claim 8, in which the oily phase D1 is reacted with the alcohol and an acid catalyst chosen from the group: hydrochloric acid, sulfuric acid, methanesulfonic acid and para-toluenesulfonic acid, at a temperature ranging from 40 to 120° C., so as to obtain a mixture M3 comprising fatty acid esters and free fatty acids.

10. The process as claimed in claim 9, in which the mixture M3 is used in the recycling step R.

11. The process as claimed in claim 9, in which an acidic, basic or neutral aqueous solution, is added to the mixture M3, which is then subjected to a separation to obtain a denser aqueous phase E2 and a less dense phase E1 containing esters.

12. The process as claimed in claim 11, in which the phase E1 is used in the recycling step R.

13. The process as claimed in claim 1, in which the basic catalyst is chosen from the group consisting of: aqueous sodium hydroxide, alcoholic sodium hydroxide, solid sodium hydroxide, aqueous potassium hydroxide, alcoholic potassium hydroxide, solid potassium hydroxide, sodium methoxide, potassium methoxide, sodium ethoxide, potassium ethoxide, sodium carbonate, and potassium carbonate.

14. The process as claimed in claim 1, in which the aqueous solutions S1 and S2 are chosen from the group consisting of: water, dilute aqueous solution of sodium hydroxide, potassium hydroxide, sodium carbonate or potassium carbonate, aqueous solution of dilute acid, and recycled aqueous streams which contain small amounts of organic materials and/or of salts.

15. The process as claimed in claim 1, in which the weight of alcohol used in step T1 is from 0.1 to 0.4 per unit weight of hydroxylated oil.

16. The process as claimed in claim 1, in which the weight of aqueous solution S1 used to obtain the reaction mixture A is from 0.01 to 0.4 per unit weight of hydroxylated oil.

17. The process as claimed in claim 1, in which the hydroxylated oil is a hydroxylated plant oil.

18. The process as claimed in claim 17, in which the hydroxylated plant oil is castor oil.

19. The process as claimed in claim 17, in which the hydroxylated plant oil is lesquerella oil.

20. The process as claimed in claim 17, in which the hydroxylated plant oil has a hydroxylated fatty acid content of greater than 50% by weight.

21. The process as claimed in claim 1, in which the transesterification steps T1 and T2 are carried out in the presence of methanol.

22. The process as claimed in claim 17, in which the phase B1 or C1 is used, optionally after a subsequent purification, as a biofuel or additive in diesel fuels.

23. The process as claimed in claim 18, in which the phase B1 or C1 is used, optionally after a purification step, as a starting material for the production of 11-aminoundecanoic acid.

\* \* \* \* \*